(12) United States Patent
Shi et al.

(10) Patent No.: US 9,737,802 B2
(45) Date of Patent: Aug. 22, 2017

(54) SYSTEM AND METHOD FOR RECOGNIZING OBJECTS PLACED TOGETHER USING SENSORS

(71) Applicants: Zheng Shi, Beijing (CN); Chunjiang Liu, Beijing (CN)

(72) Inventors: Zheng Shi, Beijing (CN); Chunjiang Liu, Beijing (CN)

( * ) Notice: Subject to any disclaimer, the term of this patent is extended or adjusted under 35 U.S.C. 154(b) by 0 days.

(21) Appl. No.: 15/086,092

(22) Filed: Mar. 31, 2016

(65) Prior Publication Data

US 2016/0210484 A1 Jul. 21, 2016

Related U.S. Application Data

(63) Continuation-in-part of application No. PCT/CN2014/092048, filed on Nov. 24, 2014, which
(Continued)

(51) Int. Cl.
*G06K 7/10* (2006.01)
*A63H 33/04* (2006.01)
(Continued)

(52) U.S. Cl.
CPC ............ *A63F 13/30* (2014.09); *A63F 9/24* (2013.01); *A63F 13/25* (2014.09); *A63F 13/573* (2014.09); *A63H 19/14* (2013.01); *A63H 19/24* (2013.01); *A63H 33/042* (2013.01); *G06K 7/10366* (2013.01); *G09B 5/06* (2013.01); *G09B 17/006* (2013.01); *G09B 19/025* (2013.01); *A63H 2200/00* (2013.01)

(58) Field of Classification Search
CPC ........ A63F 13/25; A63F 13/30; A63F 13/573; A63F 9/24; A63H 19/14; A63H 19/24; A63H 2200/00; A63H 33/042; G06K 7/10366; G09B 17/006; G09B 19/025; G09B 5/06
See application file for complete search history.

(56) References Cited

U.S. PATENT DOCUMENTS 8,854,056 B1 * 10/2014 Furuhira ............... G01N 27/22
271/227
9,041,669 B1 * 5/2015 Garg ....................... G06F 3/041
345/158

(Continued)

FOREIGN PATENT DOCUMENTS

| CN | 102039045 | 5/2011 |
| CN | 202983152 | 6/2013 |
| TW | 201020002 | 6/2010 |

OTHER PUBLICATIONS

SIPO: International Search Report for PCT Application No. PCT/CN2014/092048 filed Nov. 24, 2014, dated Mar. 2, 2015.

*Primary Examiner* — Yong Hang Jiang (57) ABSTRACT

The present invention discloses a system and method for recognizing objects placed together using capacitance sensors in conjunction with the RFID technology. A structure that is made with a material of high dielectric constant and a RFID tag that comprises a unique identification code (UID) of an object is embedded with the object. With the objects recognized, the spatial structure or the spatial distribution formed by them is derived and corresponding sensory feedbacks are provided by the system.

12 Claims, 4 Drawing Sheets

Related U.S. Application Data is a continuation-in-part of application No. PCT/CN2014/091084, filed on Nov. 14, 2014, which is a continuation-in-part of application No. PCT/CN2014/086745, filed on Sep. 17, 2014, which is a continuation-in-part of application No. PCT/CN2014/085668, filed on Sep. 1, 2014, which is a continuation-in-part of application No. PCT/CN2014/084498, filed on Aug. 15, 2014, which is a continuation-in-part of application No. PCT/CN2014/079891, filed on Jun. 13, 2014, said application No. PCT/CN2014/092048 is a continuation-in-part of application No. PCT/CN2014/090890, filed on Nov. 12, 2014, which is a continuation-in-part of application No. PCT/CN2014/080495, filed on Jun. 23, 2014, which is a continuation-in-part of application No. PCT/CN2014/079892, filed on Jun. 13, 2014.

(51) Int. Cl.

| | | |
|---|---|---|
| *G09B 19/02* | (2006.01) |
| *A63F 13/30* | (2014.01) |
| *A63F 13/25* | (2014.01) |
| *A63F 13/573* | (2014.01) |
| *A63F 9/24* | (2006.01) |
| *A63H 19/14* | (2006.01) |
| *A63H 19/24* | (2006.01) |
| *G09B 5/06* | (2006.01) |
| *G09B 17/00* | (2006.01) |

(56) References Cited

U.S. PATENT DOCUMENTS

| | | | |
|---|---|---|---|
| 2005/0052327 A1* | 3/2005 | Posluszny | H01Q 9/42 343/745 |
| 2009/0315258 A1* | 12/2009 | Wallace | A63F 3/00643 273/238 |
| 2012/0049453 A1* | 3/20 | Morichau-Beauchant | A63F 3/00214 273/236 |
| 2012/0249430 A1 | 10/2012 | Oster et al. | |

\* cited by examiner

SYSTEM AND METHOD FOR RECOGNIZING OBJECTS PLACED TOGETHER USING SENSORS

CROSS-REFERENCE TO RELATED APPLICATION

This application is a continuation in part of International Patent Application No. PCT/CN2014/092048, entitled "System and Method for Recognizing Objects Placed Together Using Sensors", filed on Nov. 24, 2014, which is a continuation in part of International Patent Application No. PCT/CN2014/091084, entitled "An Object for the Construction of a Spatial Structure", filed on Nov. 14, 2014, which is a continuation in part of International Patent Application No. PCT/CN2014/086745, entitled "System and Method for Directing a Small Scale Object to Generate a Sensory Output to a User Powered by RF Energy Harvesting", filed on Sep. 17, 2014, which is a continuation in part of International Patent Application No. PCT/CN2014/085668, entitled "System and Method for Directing a Targeted Object on an Interactive Surface to Produce a Response", filed on Sep. 1, 2014, which is a continuation in part of International Patent Application No. PCT/CN2014/084498, entitled "System and Method for Directing a Moving Object on an Interactive Surface", filed on Aug. 15, 2014, which is a continuation in part of International Patent Application No. PCT/CN2014/079891, entitled "System and Method for Operating a Computer Program with Physical Objects", filed on Jun. 13, 2014.

The International Patent Application No. PCT/CN2014/092048 is also a continuation in part of International Patent Application No. PCT/CN2014/090890, entitled "System and Method for Recognizing Objects with Continuous Capacitance Sensing", filed on Nov. 12, 2014, which is a continuation in part of International Patent Application No. PCT/CN2014/080495, entitled "System and Method to Recognize an Object's ID, Orientation and Location Relative to an Interactive Surface", filed on Jun. 23, 2014, which is a continuation in part of International Patent Application No. PCT/CN2014/079892, entitled "System and Method for Identifying an Object's ID and Location Relative to an Interactive Surface", filed on Jun. 13, 2014.

The entire disclosures of each of the above applications are incorporated herein by reference.

TECHNICAL FIELD

The present invention relates to a system and method for recognizing objects placed together using capacitance sensors in conjunction with RFID technology.

BACKGROUND

The use of toy or building blocks as an educational game has long been acclaimed as greatly beneficial to the development of children. In the late 17th century the renowned English philosopher John Locke himself mentioned that "dice and playthings, with letters in them to teach children the alphabet by playing" would make learning to read a more enjoyable experience.

The developmental merits of toy blocks have been extensively researched throughout the past centuries with studies going as far back as Maria and R. L. Edgeworth's Practical Education (1798) where they state that these consisted of "rational toys" which would aid a child to learn about gravity and physics as well as spatial relationships that would teach how many different parts become a whole.

Perhaps the most prominent educational benefits that come from playing with toy block are intellectual and creative. Intellectual benefits stem from the fact that children can develop their vocabularies as they learn to describe sizes, shapes and positions. Math skills are developed through the process of grouping, adding and subtracting, particularly with standardized blocks, such as unit blocks. Experiences with gravity, balance and geometry learned from toy blocks also provide intellectual stimulation. Creativity is also developed as children learn to make their designs and structures.

Despite the universal recognition and widespread use of toy blocks, little has been done to improve on the original design. Indeed, it appears that toy manufacturers and educators have yet to take advantage of advancements in technology that has come with the advent of the computer age.

Typically, computerized games provide players with a visual display of the game activity through an electronic display system such as a pixilated flat panel display or touch screens. Unfortunately, such displays lack a three-dimensional nature that prevents the physical interaction inherent in toys. For example, the traditional toy blocks may use one or more movable game piece that players (especially young ones) find more "natural" and easier to interact with during their play or learning experience. On the other hand, traditional toys often lack audio, visual or other forms of sophisticated feedback that computerized game play can offer to players. Therefore, a method that can combine both computerized technology and physical play can effectively enhance a player's experience by allowing their physical actions to be interpreted by a computer system so as to provide real-time feedback to the player in the form of a multitude of sensory accessories such as video and/or audio outputs.

The present invention allows recognition of multiple physical objects as well as their spatial distribution or structure, in association with various feedback mediums such as LED lighting, speakers or vibrators embedded within the object or a central device in order to communicate with the user. The invention allows for 3 dimensional structures to be physically created by a user and this structure and the individual components of this structure being recognized and located in real-time by a computer system and, in some cases, directed to perform certain actions individually or collectively according to a user-defined program.

The present invention allows creation of one or more objects that can effectively enhance traditional playing objects such as toy blocks by adding an interactive dimension to them. This also allows playing objects to be wirelessly connected to computer systems which, in turn, could be connected to the internet/servers, and thus adds another level of interactivity between the objects and the user.

Apart from the educational and entrainment benefits of having smart and interactive 3D-type of structures, there are a myriad of other potential appliances, applications and situations where efficiency and productivity can be enhanced through the use of such a novel technology.

SUMMARY OF THE INVENTION

The present invention provides a system and method for recognizing objects placed together using capacitance sensors in conjunction with the RFID technology. The system includes multiple objects, each object comprising a structure that is made with a material of high dielectric constant (for example metal) that is fully embedded in the object and near a surface of the object such that it can be detected when being placed in proximity with a capacitance sensor, and an RFID tag containing the object's unique identification code (UID). The structure that is made with a material of high dielectric constant can be a planar surface or a three dimensional shape with two parallel planar surfaces connected by a single wire of which one surface is placed at one end of the surface of the object, and the other surface is placed at the other end of the object. The system further includes a processor, a capacitance sensor operatively linked to that processor, a memory unit also operatively linked to the processor, and an RF antenna that is also operatively linked to the processor.

Once the abovementioned object's structure that is made with a material of high dielectric constant is placed on or in close proximity to a capacitance sensor, the processor is configured to receive, from the capacitance sensor, a first change in capacitance. Afterwards, the processor further identifies the UID of object through wireless communication between the RF antenna and the object's RFID tag. The processor is configured to record the information, in the memory unit, that a first object of a particular UID has been placed on the capacitance sensor. Thereafter, if a second object's structure that is made with a material of high dielectric constant is placed on or in close proximity to the electrically conductive structure of the first object, the processor is configured to detect a second change in capacitance and, as before, the processor then proceeds to determine the UID of the second object through wireless communication and to record the information, in the memory unit, that a second object of has been placed on top of or next to the first object.

As disclosed in a separate patent application PCT/CN2014/090890, a commercially available capacitance sensor is adapted to export a signal that represents a value of the capacitance being sensed, rather a binary result of "on" or "off". This adaptation allows a capacitance sensor, even at an "on" state, to continuously generate an event of capacitive sensing for the processor to analyze.

In accordance with one embodiment of the present invention, if multiple structures are embedded in an object, at least one surface of each of the structure is placed near a surface of the object.

In accordance with one embodiment of the present invention, the object could be a card, a block, a figurine, a token, a chip, or a button.

In accordance with one embodiment of the present invention, the system further includes multiple capacitance sensors arranged in an array on a planar surface, with each sensor operatively linked to a processor. Whenever a plurality of objects are placed upon the surface, the processor is configured to derive the three dimensional spatial structure formed by the objects using information about the relative location, UID and placement sequence of each object placed on the surface that the processor has received and stored in real-time.

In accordance with one embodiment of the present invention, the system further includes one or more sensory accessories operatively linked to the processor and that can be directed by the processor to provide feedback to the user. These sensory accessories could be a visual, an audio, a vibrational, or a display device. Furthermore, one or more sensorial accessories could also be embedded in an object which would then further comprise of a micro computer unit and a power source in order to run these accessories.

In accordance with one embodiment of the present invention, a simplified system is designed without the use of RFID tags embedded within each objects and no RF antenna are operatively linked to the processor. In such a design, the system would include multiple capacitance sensors arranged as an array upon a surface, in which each capacitance sensor is operatively linked to the processor. Whenever multiple objects are placed on the surface, the processor is configured to derive the spatial distribution formed by the objects from the location and placement sequence that the processor has received regarding the objects.

The present invention is useful in a variety of fields that require recognition of spatial distribution or spatial structure of objects placed together. Example applications are education, entertainment and productivity enhancement.

DETAILED DESCRIPTION OF THE INVENTION

While the present invention will be described using specific embodiments, the invention is not limited to these embodiments. People skilled in the art will recognize that the system and method of the present invention may be used in many other applications. The present invention is intended to cover all alternatives, modifications and equivalents within the spirit and scope of invention, which is defined by the apprehended claims.

Furthermore, in the detailed description of the present invention, specific details are set forth in order to provide a thorough understanding of the present invention. However, it will be obvious to one of ordinary skill in the art that the present invention may be practiced without these specific details. In other instances, well known methods, procedures, components, and circuits are not described in details to avoid unnecessarily obscuring a clear understanding of the present invention.

In addition, while a sensor system making use of capacitive sensing between a capacitance sensor and a capacitive structure embedded in an object is disclosed in connection with embodiments of the present invention, other sensor technologies such as Hall-effect sensors or piezo electric sensor can also be adapted for the purpose of this present invention and are within the scope of the present invention.

The present invention may be better understood and its numerous objects and advantages will become apparent to those skilled in the art by reference to the accompanying drawings.

The embodiments of the present invention provide a system and method for recognizing objects placed together using capacitance sensors in conjunction with the RFID technology. As disclosed in a separate patent application PCT/CN2014/090890, a commercially available capacitance sensor is adapted to export a signal that represents a value of the capacitance being sensed, rather a binary result of "on" or "off". This adaptation allows a capacitance sensor, even at an "on" state, to continuously generate an event of capacitive sensing for the processor to analyze.

Figure 1:
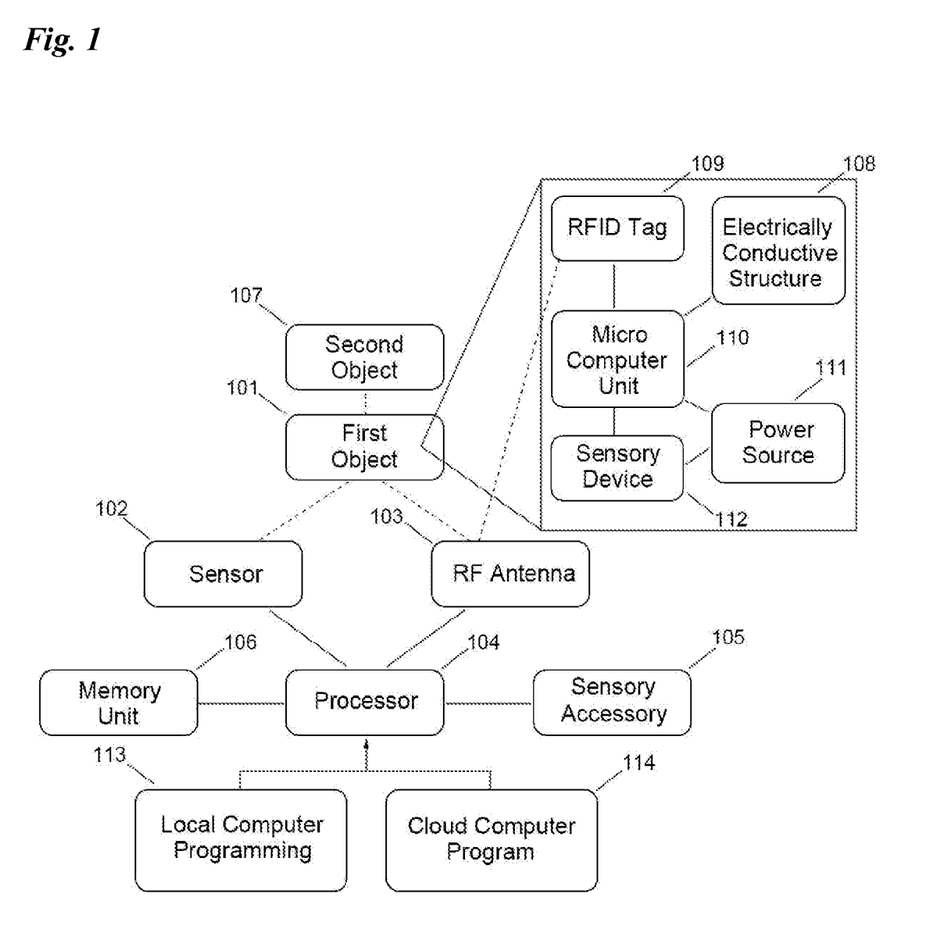
FIG. 1 is an exemplary schematic diagram illustrating the system process flow in accordance with one embodiment of the present invention.

FIG. 1 is an exemplary schematic diagram illustrating the system process flow in accordance with one embodiment of the present invention. As shown in FIG. 1, the system includes an object 101 comprising a structure that is made with a material of high dielectric constant (typically consisting of a metal such as copper) 108 that is fully embedded in the object and near a surface of the object such that it can detected when being be placed in proximity with a capacitance sensor, and an RFID tag 109 that comprises the unique identification code (UID) of the object 101. The system further includes a capacitance sensor 102, a memory unit 106 and an RF antenna 103, all of which are operatively linked to a processor 104. Once the first object 101 is placed on or in close proximity to the capacitance sensor 102, the processor 104 is configured to receive, from the capacitance sensor 102, a change in capacitance. Thereafter, the processor determines the UID of the first object 101 through wireless communication between its RF antenna 103 and the RFID tag of the first object 101 and proceeds to record the information pertaining to the first object's 101 location (i.e., the location of the capacitance sensor 102) and UID in the memory unit 106.

Once a second object 107 is placed on top of the first object that has already been detected by the sensor 102, the processor 104 is configured to receive, from the sensor 102, a second change in capacitance, and then from the RF antenna 103, the UID of the second object, and to record the information, in the memory unit 106, that the second object 107 of a particular UID has been placed on top of or next to the first object 101, and that the second object 107 has the same location as the sensor 102.

The system in FIG. 1 can be designed to further include sensory accessories 105 that are operatively linked to the processor 104 and that are instructed by the processor 104 to supply feedback to the user. The sensory accessory 105 can be a visual, an audio, a vibrational, or a display device. The processor 104 that is operatively linked to a computer program is configured to process the recorded information and instruct sensory accessories to provide users with feedback. The computer program can be run either locally or remotely, e.g., from a cloud server. The sensory device 112 can also be embedded in the objects 101 and 107 which further comprise a micro computer unit 110 and a power source 111.

The objects of the present invention can be designed as a card, a block, a figurine, a token, a chip or a button.

The structure that is made with a material of high dielectric constant 108 embedded within the object can be a flat disc or a three dimensional shape of two parallel flat discs physically connected by a single electric wire, of which one disc is placed near one end of the object 101, and the other disc is placed at the other end of the object 101. If multiple structures are embedded in an object, at least one surface of each of the structure is placed near a surface of the object 101.

In accordance to one embodiment of the present invention, the system described in FIG. 1 can further includes multiple objects, each comprising a structure that is made with a material of high dielectric constant and an RFID tag (containing the UID of each individual object), and multiple capacitance sensors arranged in an array upon a surface with each capacitance sensor operatively linked to the processor 104. Within this particular embodiment, once multiple objects are placed on or in close proximity of the surface's capacitance sensors or the structure that is made with a material of high dielectric constant of another object that is already placed on top of a capacitance sensor, the processor is configured to derive the spatial structure formed by the objects from the location (i.e., the location of a capacitance sensor relative to other capacitance sensors), UID and placement sequence that the processor has received regarding the objects.

Figure 2A:
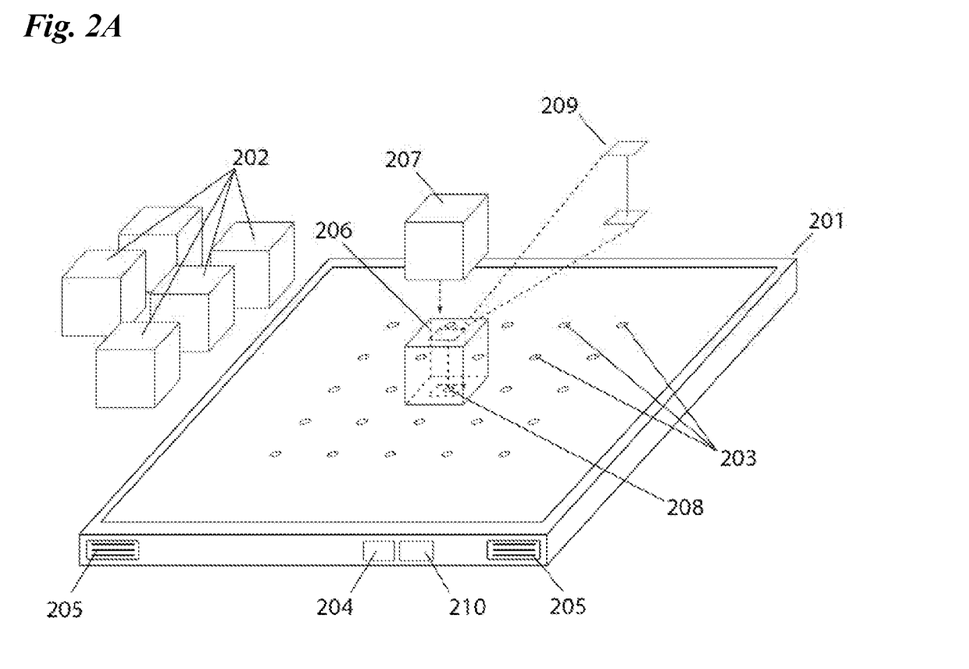
FIGS. 2A and 2B are exemplary schematic diagrams illustrating the recognition of the spatial distribution formed by objects placed together in accordance with one embodiment of the present invention.
Figure 2B:
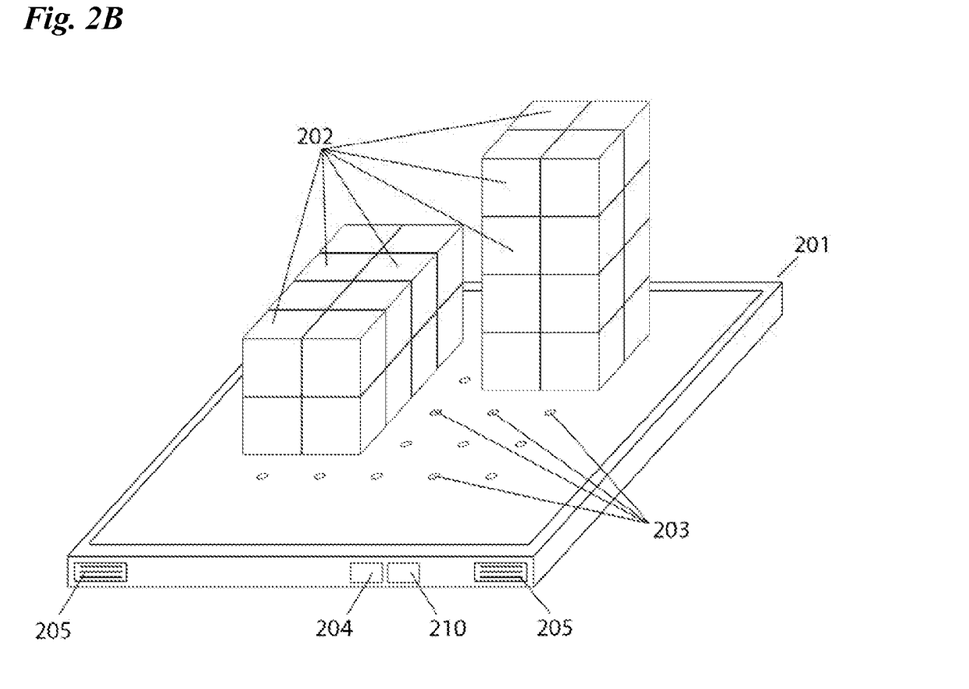

FIGS. 2A and 2B are exemplary schematic diagrams illustrating the recognition of the spatial distribution formed by objects placed together in accordance with one embodiment of the present invention.

As shown in FIG. 2A, the system includes a plurality of cubes 202, each being of identical size and shape and each having a structure that is made with a material of high dielectric constant 209 that is fully embedded in the cube. The structure 209 is in a three dimensional shape of two parallel flat discs connected by a single electric wire, of which one disc is placed near one face of the cube and the other disc is placed near the opposite face such that the structure can be detected when being placed in proximity with a capacitance sensor 203. The cubes in this design are not embedded with any RFID tags.

As illustrated in FIG. 2A, the system further includes a processor 204, a memory unit 210 that is operatively linked to the processor 204, and multiple capacitance sensors 203 that are arranged as an array on a surface 201. Each capacitance sensor 203 is operatively linked to the processor 204. The processor 204 is further linked to an audio system 205 which provides sensory feedback to the user.

Once a first cube 206 is placed on a particular capacitance sensor 208, the processor 204 is configured to detect the change in capacitance for that capacitance sensor 208. The processor is then configured to record the information, in the memory unit 210, that a cube has been placed on top of that particular capacitance sensor. Thereafter, if a second cube 207 is placed on top of the first cube 206, the processor 204 is configured to further detect yet another change in capacitance experience by that capacitance sensor 208. As before, the processor 204 then proceeds to record the information relating to the presence of a second cube 207 placed on top of the first cube 206 (which is itself located on that particular capacitance sensor 208) in the memory unit 210.

Similarly, as shown in FIG. 2B, the same system as described in FIG. 2A is presented but with a number of cubes 202 already placed upon the surface 201. Using the process described previously, the processor has mapped out, through an inductive process, the spatial distribution of all the cubes 202 placed on its surface. The processor 204 that is operatively linked to a computer program is then configured to process that information and instruct sensory accessories to provide the player with feedback. For example, as shown in FIG. 2B, once different geometries are built with the cubes 202 according to a specific cube placement sequence, audio feedback can be provided to the user by broadcasting the volume and the surface area of the created geometry. The spatial distribution of the geometries can be further presented on a display device for the player to see, and in particular, the two or three dimensional sections of the created shapes. By playing this simple geometric game, players can learn easily basic geometric concepts such as volume and surface area. For example, they may try to build up geometries in different shapes with a certain amount of cubes, and thus understand that, even with the same volume, the surface area can vary according to the shape created.

Figure 3A:
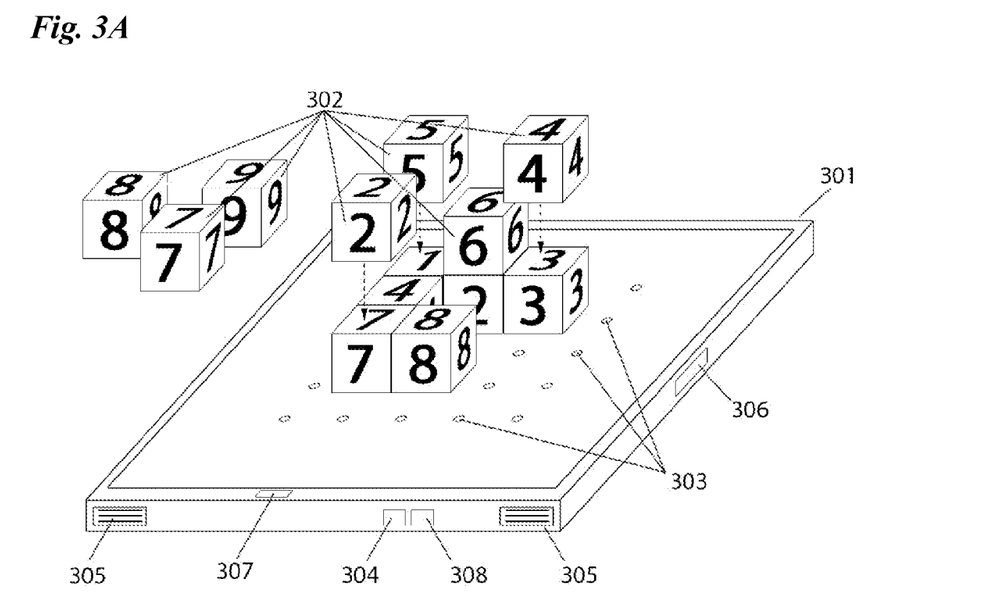
FIGS. 3A and 3B are exemplary schematic diagrams illustrating the system for a simplified 3-D Sudoku game in accordance with one embodiment of the present invention.
Figure 3B:
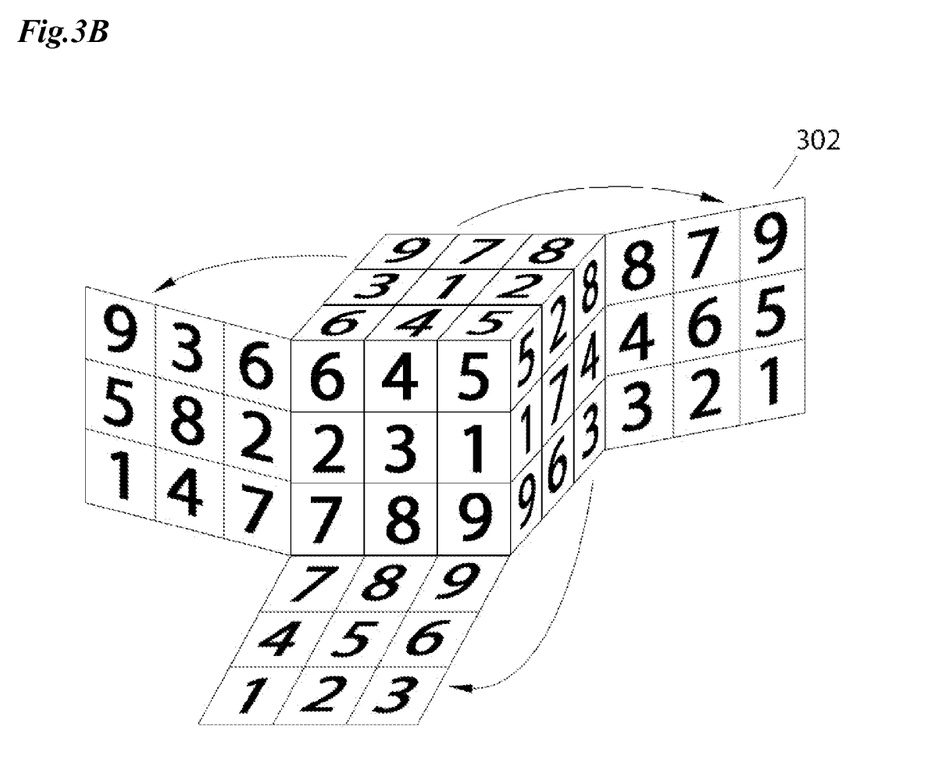

FIGS. 3A and 3B are exemplary schematic diagrams illustrating the system for a simplified 3-D Sudoku game in accordance with one embodiment of the present invention. For the sake of illustration, both the system and method described in FIGS. 3A and 3B makes use of the 3-D mathematics game Sudoku as the design of the game is particular well suited for this embodiment of the invention. In this game, a total of 27 cubic blocks are used to form a 3×3×3 cube containing totally nine 3×3 planar sub-grids, three in each directions. When the puzzle is in the solved condition, each 3×3 planar sub-grid bears nine single-digit natural numbers (1-9) without duplicates.

The system of the embodiment described in FIG. 3A includes a total of 27 cubic blocks 302, a processor 304, a memory unit 308 operatively linked to the processor 304, an RF antenna 306 also operatively linked to the processor 304, and multiple capacitance sensors 303 arranged in an array on a surface 301. Each cubic block 302 has exactly the same size, and is printed with one Arabic numeral on all of its six sides, and is embedded with a structure that is made with a material of high dielectric constant. Each cubic block further has an RFID tag embedded into it containing the cubic block's unique identification code (UID). Each capacitance sensor 303 is operatively linked to the processor 304. The processor 304 is further linked to an audio system 305 and LED lights 307 in order to provide feedback to the user.

Once a first cubic block 302 is placed on a particular capacitance sensor 303, the detected change in capacitance experienced by the capacitance sensor is relayed to the processor 304. The processor 304 is then configured to receive from that particular capacitance sensor 303 in order to wirelessly communicate the UID of the detected cubic block 302 back to the processor. The processor then proceeds to record the information relating to the location and the UID of the cubic block in the memory unit 308. Thereafter, if a second cubic block is placed on top of the first cubic block that has already been detected by the particular capacitance sensor 303, the processor 304 is then configured to receive, from that particular capacitance sensor 303, a second change in capacitance, and via the RF antenna 306, the UID of the second cubic block. Again, the processor 304 then proceeds to record, in the memory unit 308, the information relating to the second cubic block's location (i.e., on top of the first cubic block which is itself on top of that particular capacitance sensor) and UID. Similarly, whenever a new cubic block 302 is placed on the surface 301 or on top of another cubic block that has itself been already detected by a capacitance sensor, its location and UID is determined in real time by the processor 304. Finally, once all of the 27 cubic blocks 302 are put into play forming a 3×3×3 cube, the processor 304 is configured to derive the spatial structure formed by the cubic blocks 302 from the location, UID and their placement sequence and according to the aggregate information derived, the processor can determine whether the game is won or lost.

Once the spatial structure formed by the cubic blocks 302 has been derived and the computer program has determined whether the game has been lost or won, the processor 304 operatively linked to the computer program is configured to process the information and instruct sensory accessories to provide feedback to the user. The computer program stores relevant information and is defined based on the rules of the Sudoku game explained previously. As shown in FIG. 3A, the sensory devices include an audio device 305 and LED lights 307. If all cubic blocks 302 are correctly placed (i.e., each 3×3 planar sub-grid of the cube bears nine single-digit natural numbers 1-9 without duplicates, as seen in FIG. 3B), positive feedback will be provided to the player. For example, an audio clip can be played via the audio device 305, such as "Well done! Mission completed!" or "You are a genius!", to express congratulations to the player. And the feedback effect can be further enhanced with the LED lights 307 lighting up. If the solution is not correct, the players will be instructed to try again, preferably via the audio device 305, until the puzzle is successfully solved.

Figure 4:
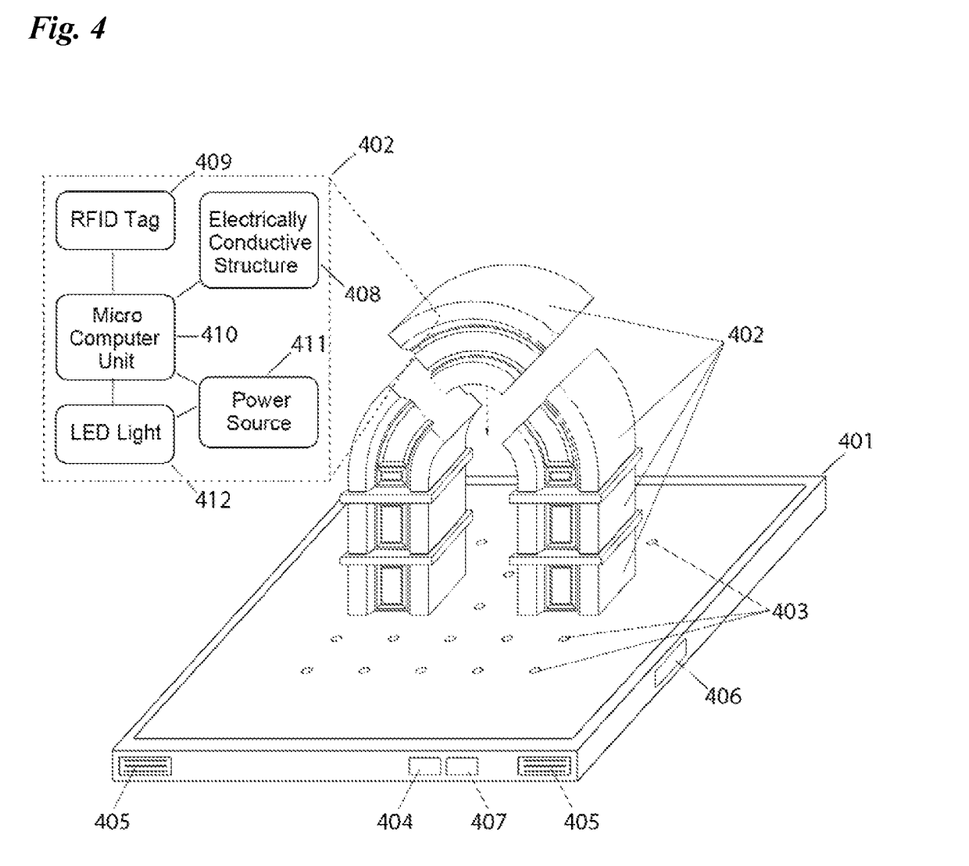
FIG. 4 is an exemplary schematic diagram illustrating the system for a building block game in accordance with one embodiment of the present invention.

FIG. 4 is an exemplary schematic diagram illustrating the system for a building block game in accordance with one embodiment of the present invention.

As shown in FIG. 4, the system includes a plurality of building blocks 402, a processor 404, a memory unit 407 operatively linked to the processor 404, an RF antenna 406 also operatively linked to the processor 404, and multiple capacitance sensors 403 arranged in an array on a surface 401. Each building block 402 comprises a structure that is made with a material of high dielectric constant 408 that is fully embedded in the building block and near a surface of the building block such that it can be detected when being placed in proximity with a capacitance sensor, and an RFID tag 409 containing the unique identification code (UID) of the building block. Each capacitance sensor 403 is operatively linked to the processor 404. The processor 404 is further linked to an audio system 405 to provide feedback to the user. An LED light 412 is embedded in each building block 402, with the building block further having a micro computer unit 410 and a power source 411 in order to allow for the proper functioning of the LED light 412.

As with the previous embodiments, once a first building block 402 is placed on a capacitance sensor 403, a change in capacitance is detected by the processor 404 via the capacitance sensor 403. This leads the processor 404 to determine the UID of the first building block through wireless communication between the RF antenna 406 and the RFID tag 409 of the building block. Once these steps are complete, the processor 404 records the information pertaining to the relative location and UID of the first building block of a particular UID in the memory unit 407.

As a second building block is placed on top of the first building block that has already been detected by the particular sensor 403, the processor 404 is configured to receive, from that particular sensor 403, a second change in capacitance, and from the RF antenna 406, the UID of the second building block, and to record, in the memory unit 407, the information that the second building block of a particular UID has been placed on top of or next to the first building block, and that the second building block has the same location as the particular sensor 403. Similarly, whenever a new building block 402 is placed on the surface 401 or on other building blocks, its location and UID is figured out by the processor 404. Referring back to FIG. 4, one can see that the building blocks 402 have been placed in such a manner as to form the classical arch structure with the keystone placed in the middle. The processor 404 is configured to derive the spatial structure of the architecture formed by all of the building blocks 402 from the aggregate location, UID and placement sequence information that it has received regarding these building blocks 402.

Once the spatial structure of the arch illustrated in FIG. 4 is derived, the computer program operatively linked to the processor is configured to instruct certain sensory accessories to provide the user with feedback. As seen in FIG. 4, the sensory device includes an audio device 405. According to the computer program, the processor 404 will further instruct all building blocks 402 embedded with LED lights 412 to light up for the user. So for example, if the user is instructed to form an arch structure with the keystone on top and if all building blocks 402 are then correctly placed to form the required structure, the LED lights 412 embedded within the building blocks will light up in order to provide positive feedback to the user.

Another potential feedback design would consist of having an audio clip can be played via the audio device 405 to confirm the successful creation of the arch structure and could potentially be followed by an audio recording detailing the significance of this structure in architecture and history. Furthermore, each building block can be assigned with a musical symbol or note that corresponds to their UID, and embedded with an audio device. Once all building blocks are placed correctly to form the required spatial structure, the string of music symbols and notes assigned to the building blocks is also correctly determined to create a music melody that can be played real-time, in a correct sequence, via the audio devices embedded in all building blocks. As per the computer program, and with a certain type of input, e.g., any building block being pressed, the processor can give the instruction to play the melody, and thus a musical architecture is created.

The invention claimed is:

1. A system for recognizing objects that are placed together, comprising:
   a plurality of objects, each object comprising a structure that is made with a material of high dielectric constant and is fully embedded in the object and near a surface of the object, and an RFID tag that comprises a unique identification code (UID) of the object, wherein the structure assumes a three dimensional shape of two parallel flat metal discs connected by a single electric wire, and wherein one disc is placed near a surface of the object, and the other disc is placed near the opposite surface of the object,
   a processor,
   a memory unit operatively linked to the processor,
   a capacitance sensor that is operatively linked to the processor and is configured to measure a capacitance change each time an object is placed on or in close proximity to the capacitance sensor, and each time an object is placed on another object that is placed on or in close proximity to the capacitance sensor,
   an RF antenna that is operatively linked to the processor,
   wherein, upon an object being placed on the sensor, the processor is configured to receive, from the sensor, a first change in capacitance, and from the RF antenna, the UID of the object, and to record the information that a first object of a particular UID has been placed on the sensor,
   and wherein, upon a second object being placed on top of the first object, the processor is configured to receive a second change in capacitance, and the UID of the second object, and to record the information that a second object of a particular UID has been placed on top of the first object.

2. The system in claim 1, wherein multiple structures are embedded in an object, and wherein at least one surface of each of the structure is placed near a surface of the object.

3. The system of claim 1, further comprising multiple sensors arranged in an array on a surface, with each sensor operatively linked to the processor, wherein, upon a second object being placed on a first object that has been detected by a particular sensor, the processor is configured to receive, from that particular sensor, a second change in capacitance, and from the RF antenna, the UID of the second object, and to record the information that the second object of a particular UID has been placed on top of the first object, and that the second object has the same location as that particular sensor.

4. The system of claim 3, wherein, upon a plurality of objects being placed on the surface, the processor is configured to derive the spatial structure formed by the objects from the location, UID and placement sequence that the processor has received regarding the objects.

5. The system in claim 1, further comprising a sensory accessory selected from a group comprising of a visual, an audio, a vibrational and a display device, wherein the processor is configured to instruct the sensory accessory to provide a user feedback.

6. The system in claim 5, wherein the sensory accessory is embedded in an object, and wherein the object further comprising a micro computer unit and a power source.

7. A method for recognizing objects that are placed together, comprising:
   placing a first object among a plurality of objects on a capacitance sensor, wherein each of the object comprises a structure that is made with a material of high dielectric constant that is fully embedded in the object and near a surface of the object, and a RFID tag that comprises a unique identification code (UID) of the object, wherein the structure assumes a three dimensional shape of two parallel flat metal discs connected by a single electric wire, and wherein one disc is placed near a surface of the object, and the other disc is placed near the opposite surface of the object,
   receiving a first change in capacitance from the sensor by a processor that is operatively linked to the sensor, and is configured to measure a capacitance change each time an object is placed on the capacitance sensor, and each time an object is placed on another object that is placed on the capacitance sensor,
   receiving the UID of the first object from an RF antenna by the processor that is operatively linked to the RF antenna,
   placing a second object on top of the first object,
   receiving, by the processor, a second change in capacitance,
   receiving, by the processor, the UID of the second object,
   recording, by the processor, the information that a second object of a particular UID has been placed on top of the first object.

8. The method in claim 7, wherein multiple structures are embedded in an object, and wherein at least one surface of each of the structure is placed near a surface of the object.

9. The method of claim 7, wherein multiple sensors are arranged in an array on a surface, with each sensor operatively linked to the processor, and wherein, upon a second object being placed on a first object that has been detected by a particular sensor, the processor is configured to receive, from that particular sensor, a second change in capacitance, and from the RF antenna, the UID of the second object, and to record the information that the second object of a particular UID has been placed on top of the first object, and that the second object has the same location as that particular sensor.

10. The method of claim 9, further comprising, upon a plurality of objects being placed on the surface, deriving, by the processor, the spatial structure formed by the objects from the location, UID and placement sequence that the processor has received regarding the objects.

11. The method in claim 7, wherein the processor is configured to instruct a sensory accessory to provide a user feedback, and wherein the sensory accessory is selected from a group comprising of a visual, an audio, a vibrational and a display device.

12. The method in claim 11, wherein the sensory accessory is embedded in an object, and wherein the object further comprising a micro computer unit and a power source.

* * * * *